United States Patent
Pruitt et al.

(10) Patent No.: US 8,006,470 B2
(45) Date of Patent: Aug. 30, 2011

(54) CROP HARVESTER HAVING METAL CONDITIONER ROLLS WITH HERRINGBONE RIB PATTERN

(75) Inventors: Martin E. Pruitt, Hesston, KS (US);
Dwight E. Nickel, Newton, KS (US);
Kurt Graber, Moundridge, KS (US);
Stanley R. Clark, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 799 days.

(21) Appl. No.: 11/247,806

(22) Filed: Oct. 11, 2005

(65) Prior Publication Data
US 2007/0079592 A1 Apr. 12, 2007

(51) Int. Cl.
*A01D 61/00* (2006.01)
(52) U.S. Cl. ............... 56/16.4 C; 56/16.4 A; 56/16.4 B
(58) Field of Classification Search ............... 56/16.4 C, 56/14.3, 14.1, DIG. 1, 16.4 R
See application file for complete search history.

(56) References Cited

U.S. PATENT DOCUMENTS

| | | | | |
|---|---|---|---|---|
| 3,488,929 A * | 1/1970 | Hale | ................................... | 56/1 |
| 3,513,645 A | 5/1970 | Garrett et al. | | |
| 3,656,284 A * | 4/1972 | Meek et al. | ................. | 56/14.5 |
| 3,732,670 A * | 5/1973 | Milliken et al. | ........... | 56/16.4 C |
| 3,851,450 A * | 12/1974 | Nelson | ............................. | 56/14.4 |
| 4,075,822 A * | 2/1978 | Heckley et al. | ........... | 56/16.4 C |
| 4,127,979 A * | 12/1978 | Hoch | .......................... | 56/16.4 C |
| 4,177,625 A * | 12/1979 | Knight et al. | .................. | 56/13.6 |
| 4,242,409 A * | 12/1980 | Parker | ............................ | 428/181 |
| 4,445,313 A * | 5/1984 | Elliott et al. | ................ | 56/16.4 C |
| 4,539,797 A * | 9/1985 | McLean | ........................ | 56/12.3 |
| 4,821,494 A * | 4/1989 | O'Halloran et al. | ........ | 56/16.4 C |
| 4,896,490 A * | 1/1990 | Grenzebach | ................ | 56/16.4 R |
| 4,922,692 A * | 5/1990 | Linde et al. | ................. | 56/16.4 C |
| 5,142,848 A * | 9/1992 | Seymour | .................... | 56/16.4 C |
| 5,269,124 A | 12/1993 | Barthel et al. | | |
| 5,419,106 A * | 5/1995 | Gemelli | ..................... | 56/16.4 B |
| 6,050,070 A | 4/2000 | Cook | | |
| 6,158,201 A | 12/2000 | Pruitt et al. | | |
| 6,360,515 B1 * | 3/2002 | Cook | .............................. | 56/14.1 |
| 6,499,283 B1 | 12/2002 | Cook | | |
| 6,904,741 B2 * | 6/2005 | Priepke | ....................... | 56/16.4 C |
| 6,955,034 B1 * | 10/2005 | Blakeslee et al. | ........... | 56/16.4 C |
| 7,021,038 B2 * | 4/2006 | Priepke | ....................... | 56/16.4 C |
| 2005/0097874 A1 | 5/2005 | Priepke | | |
| 2005/0126147 A1 | 6/2005 | Nickel et al. | | |

OTHER PUBLICATIONS

AgLand Brochure entitled "Macerator 6600" including (front page, 4 additional pages; and back page (printed in Canada 1002).

\* cited by examiner

*Primary Examiner* — Árpád Fábián-Kovács

(57) ABSTRACT

The conditioning rolls of a crop harvester have intermeshing metal ribs arranged in a herringbone pattern, each rib comprising a pair of end-to-end segments that converge spirally from opposite ends of the roll to a centermost apex. Alternative embodiments provide a single pair of metal herringbone rolls, two pairs of metal herringbone rolls, or a front pair of metal herringbone rolls and a rear pair of compressible surface herringbone rolls.

10 Claims, 12 Drawing Sheets

CROP HARVESTER HAVING METAL CONDITIONER ROLLS WITH HERRINGBONE RIB PATTERN

TECHNICAL FIELD

This invention relates to the field of crop harvesting equipment and, more particularly, to a method and apparatus for obtaining conditioned crop materials with improved drying characteristics and more even crop distribution within a windrow or swath.

BACKGROUND AND SUMMARY

Conditioning rolls with helical ribs or bars extending in a continuous spiral from one end of the roll to the other have a tendency to load up crop materials along one side of the conditioned crop discharge flow from the rolls. Consequently, the resulting windrows or swaths may be less uniform than desired, with heavier accumulations along one side than the other. This can have an adverse effect upon drying times and hay quality. Moreover, in many harvesters the cutting swath is wider than the centrally disposed inlet opening to the conditioning rolls such that outboard severed materials must be gathered centrally by augers or other means before they can enter the inlet. This increases the likelihood that the discharge flow will have heavier accumulations of materials along its sides than in the middle, in contrast to the desired goal of having the flow as uniform as possible across its entire width.

The present invention provides a novel method and apparatus for obtaining improved crop conditioning. In its broadest aspects it involves the discovery that significantly more uniform distribution can be obtained when the rib pattern is herringbone-shaped, rather than a continuous spiral, and the rolls are constructed from a hard, non-compressible material, such as steel. The herringbone pattern naturally tends to draw the outer materials toward the center of the rolls when the pattern is properly oriented with respect to the direction of roll rotation, and the hard, metal nature of the ribs makes their centering action even more aggressive than would otherwise be the case. This is especially beneficial in harvesters using rotary cutters as the means for severing the standing crop from the ground as these machines tend to run faster and present higher quantities of materials to the rolls in less time than sickle-type machines, presenting an even greater challenge to uniform distribution within the windrow or swath.

In another aspect the present invention contemplates passing the severed materials through dual sets of conditioning rolls wherein both front and rear pairs of the rolls are constructed from metal and have herringbone rib patterns, providing an extra level of conditioning coupled with speed and uniformity that has particular utility for rotary cutoff machines. For sickle-type machines, it may be appropriate to use metal, herringbone rolls at the front and compressive-surface herringbone rolls at the rear.

DETAILED DESCRIPTION

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments. For example, the present invention has been illustrated in connection with a self-propelled harvester. However, it will be appreciated that the principles of the present invention may readily be incorporated into a pull-type machine and/or a machine that does not sever crop materials from the field but only performs a separate conditioning function.

The Prior Art Machine of FIGS. 1-9

The machines of the present invention as illustrated in FIGS. 10-15 are similar in many respects to the prior art machine illustrated in FIGS. 1-9. Accordingly, the description which follows initially sets forth details of construction of the prior art machine of FIGS. 1-9, with the understanding that many of such details apply equally as well to the machines of FIGS. 10-15.

Figure 1:
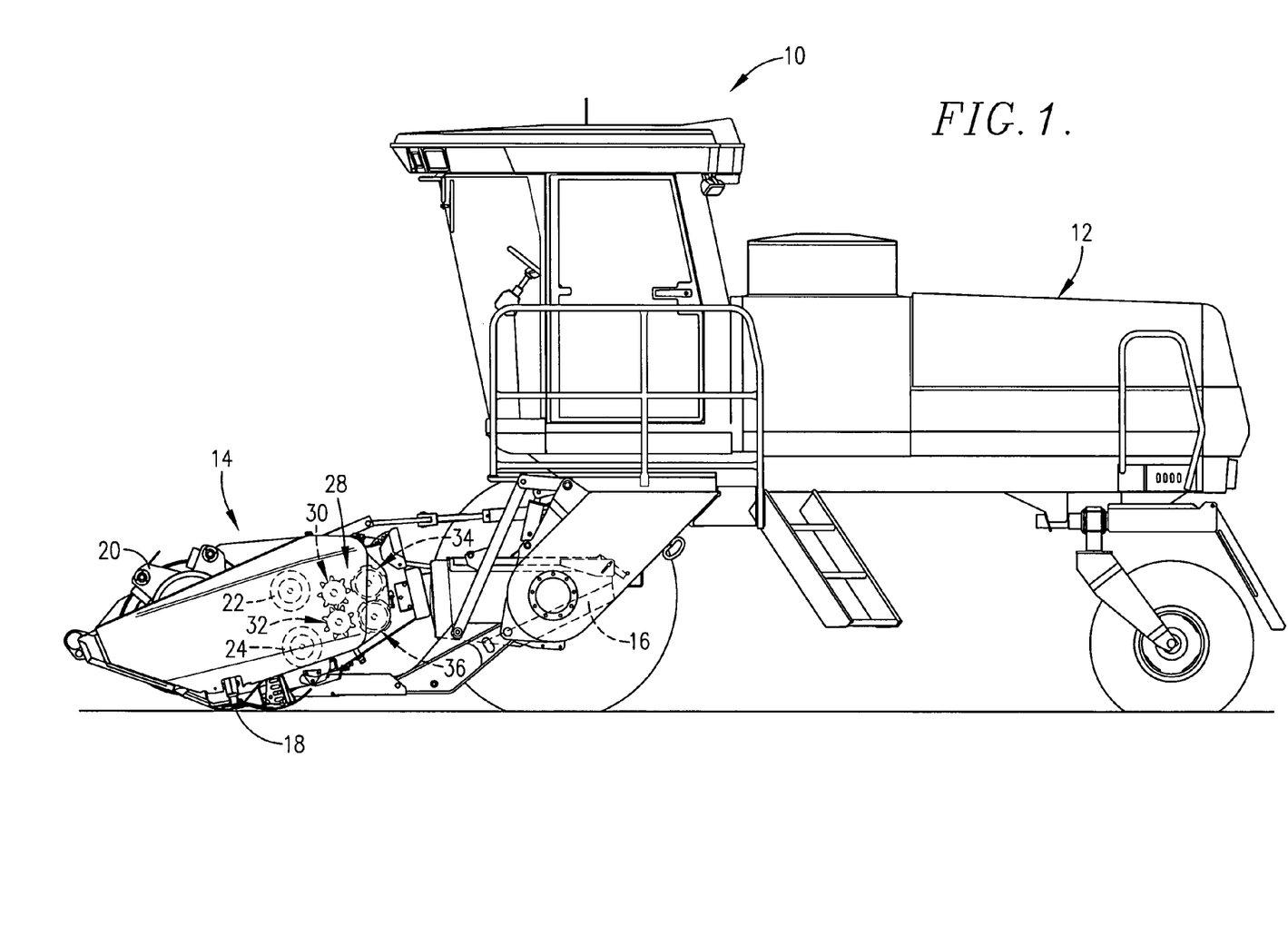
FIG. 1 is a side elevational view of a prior art harvester in the nature of a self-propelled windrower having conditioning rolls with ribs and bars that spiral in the same direction for the full length of the rolls.

The self-propelled windrower 10 in FIG. 1 broadly includes a tractor 12 and a header 14 mounted on the front end of tractor 12. Generally speaking, windrower 10 is capable of severing standing crop materials from the ground as tractor 12 advances header 14 across the field, conditioning the stems of such materials as they are passed rearwardly through header 14, and then returning the conditioned materials to the ground underneath tractor 12 in a windrow or swath depending upon the position of various forming shields 16 shown in phantom in FIG. 1. Header 14 in the illustrated embodiment has a reciprocating sickle 18 for severing standing materials from the ground, a rotating reel 20 for sweeping the standing materials into sickle 18 to improve cutoff, and a pair of vertically spaced, oppositely rotating, full-length augers 22 and 24 that converge the severed crop centrally and propel it rearwardly as the machine advances. As shown particularly in FIGS. 6 and 7, header 14 has a rear opening 26 behind augers 22, 24 for receiving crop materials therefrom and admitting such materials into the crop conditioning mechanism therebehind broadly denoted by the numeral 28.

The conditioning mechanism 28 includes a pair of front, counter-rotating conditioning rolls 30 and 32 and a pair of rear, counter-rotating, conditioning rolls 34 and 36. Front rolls 30, 32 have non-compressible surfaces made of a hard material such as steel, while rear rolls 34, 36 have compressible surfaces and are made of softer materials such as rubber, neoprene or elastomer. In one preferred embodiment, rear rolls 34, 36 are constructed from molded rubber layers that are cured and subsequently machined so as to provide a specially configured surface as explained in more detail below, although the rear rolls may instead be provided with smooth surfaces. Improved conditioning action can be obtained over a fairly wide range of hardness of the compressible surface on rolls 34, 36, but best results have been obtained using rubber having a hardness of 70-80 Shore A.

Front conditioning rolls 30, 32 may take the form of fluted or ribbed steel rolls of the type used for many years in HESSTON brand windrowers and mower conditioners. Each of the front rolls 30, 32 thus has a series of radially outwardly projecting, somewhat triangular in cross section and relatively narrow ribs 38 that extend along the entire length of the roll in a continuous helical pattern from end-to-end. Ribs 38 project outwardly from a cylindrical core 40 of each roll and are spaced around the roll in such a manner that the ribs on top roll 30 may intermesh with the ribs on bottom roll 32 during operation.

On the other hand, in the particular illustrated embodiment each of the rear rolls 34, 36 is provided with a series of radially outwardly projecting, relatively wide bars 42 that are fewer in number and wider than the ribs 38 on front rolls 30, 32. Bars 42 project outwardly from a cylindrical core 43 on each rear roll and extend longitudinally the full length of the roll in a continuous helical pattern from end-to-end. Preferably, the bars 42 of upper and lower rear rolls 34, 36 are intermeshed with one another.

Front rolls 30, 32 are adapted for relative movement toward and away from one another. Similarly, rear rolls 34, 36 are adapted for relative movement toward and away from one another. In the illustrated embodiment, front rolls 30, 32 are mounted in such a way that lower roll 32 can move toward and away from upper roll 30 to a limited extent, while the vertical position of upper roll 30 remains fixed. This relationship could be reversed. On the other hand, upper rear roll 34 is mounted to move toward and away from lower rear roll 36 to a limited extent while the position of lower rear roll 36 remains fixed. This relationship could also be reversed. The details of construction permitting such mounting arrangement and movement are illustrated in particular in FIGS. 2, 4 and 6-8, it being noted that only the left ends of the rolls are illustrated in several of those figures. Thus, the following description will focus on the left end of the rolls, with the understanding that corresponding arrangements are provided at the right ends.

Figures 8, 9:
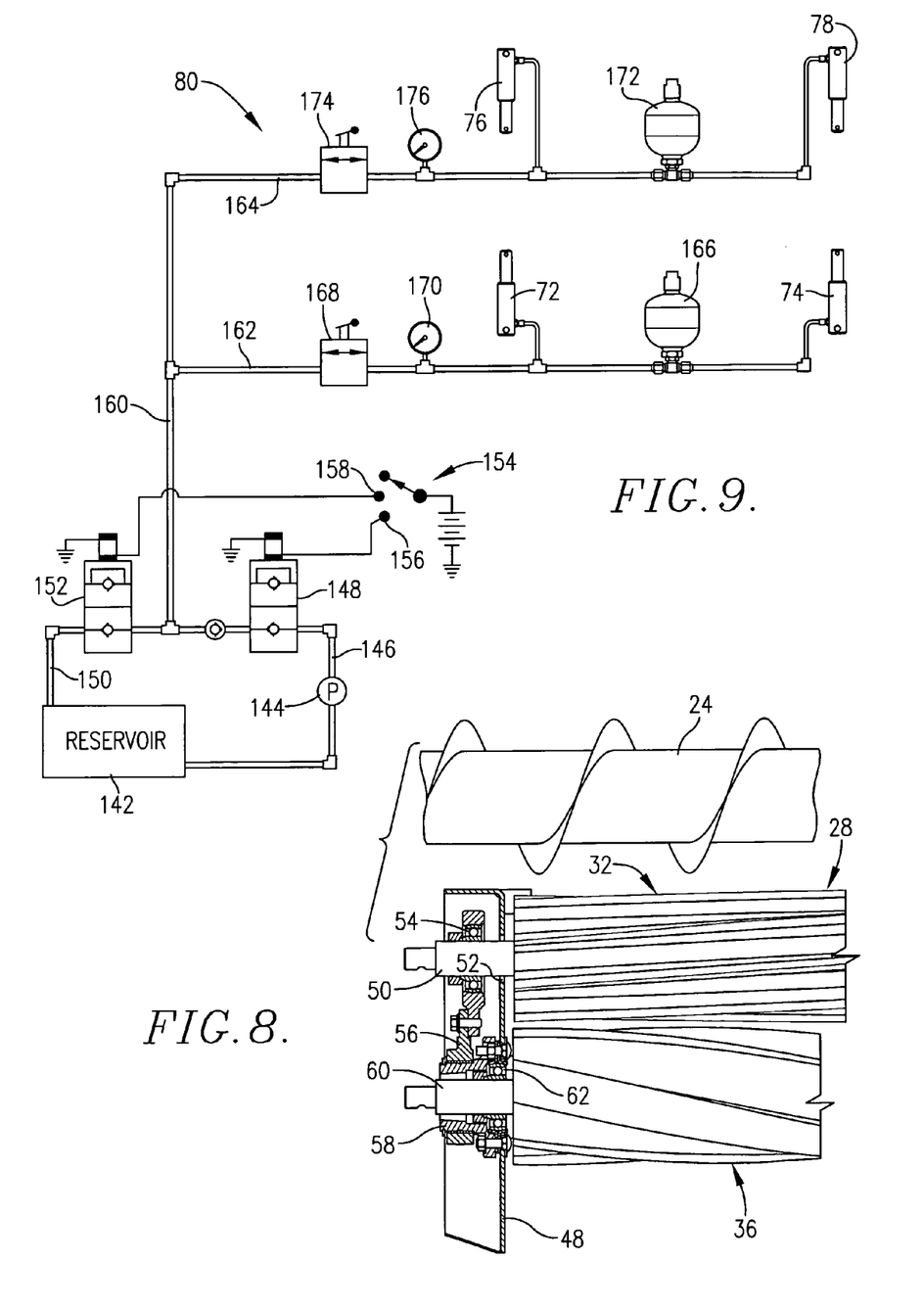
FIG. 8 is a fragmentary generally horizontal cross-sectional view of the prior art header looking downwardly through the two lower rolls illustrating their mounting arrangement and their relationship to the center-gathering augers in front of the rolls.
FIG. 9 is a schematic illustration of a simplified prior art hydraulic circuit for applying tensioning force to the rolls of the machine.

All of the rolls are provided with stub shafts projecting outwardly from opposite ends thereof as exemplified by the stub shaft 44 of top front roll 30. The stub shaft 44 of top front roll 30 is journaled by bearings 46 that are in turn fixedly attached to an upright end wall 48 such that the axis of rotation of top front roll 30 does not move in any direction. On the other hand, the stub shaft 50 of lower front roll 32 passes through a generally upright slot 52 in end wall 48 and is journaled by a set of bearings 54 that are attached to a support assembly 56 swingable up and down about the axis of lower rear roll 36. Slot 52 is slightly arcuate with its center at the axis of the lower rear roll 36. As illustrated in FIG. 8, the rear end of support assembly 56 is pivotally mounted on a trunnion mount 58 that encircles the stub shaft 60 of lower rear roll 36 and is attached to a bearing 62 for stub shaft 60. Bearing 62, in turn, is fixedly secured to end wall 48 so as to remain in a fixed location at all times. The stub shaft 64 of upper rear roll 34 is journaled by a set of bearings (not shown) that are in turn carried by a vertically swingable support assembly 68 having its axis of swinging movement coinciding with the axis of top front roll 30. A trunnion mount 69 (FIG. 6) encircles stub shaft 44, pivotally supports the support assembly 68, and is fixed to bearing 46. Stub shaft 64 of upper rear roll 34 passes through a generally upright slot 70 in end wall 48, such slot 70 being slightly arcuate with its center at the axis of rotation of upper front roll 30.

Tension is applied to the rolls 30-36 by four single-acting tension hydraulic cylinders 72, 74, 76 and 78 as illustrated in FIG. 9. Tension cylinders 72 and 74 are used for applying tension to the front rolls 30-32, while the cylinders 76 and 78 are used for applying tension to the rear rolls 34, 36. Front cylinders 72, 74 are located at opposite ends of lower front roll 32, while rear cylinders 76, 78 are located at opposite ends of upper rear roll 34. More specifically, each front cylinder 72, 74 is secured to a corresponding end wall 48 along the lower front extremity thereof and projects upwardly therefrom for pivotal connection with the lower front extremity of support assembly 56. Correspondingly, each rear cylinder 76, 78 is secured to the upper rear extremity of an end wall 48 and projects downwardly therefrom for pivotal connection with the upper rear extremity of support assembly 68. Cylinders 72-78 thus comprise part of a tension mechanism broadly denoted by the numeral 80 in FIG. 9 that urges rolls 30, 32 and 34, 36 relatively toward one another and resists their separation.

Figure 2:
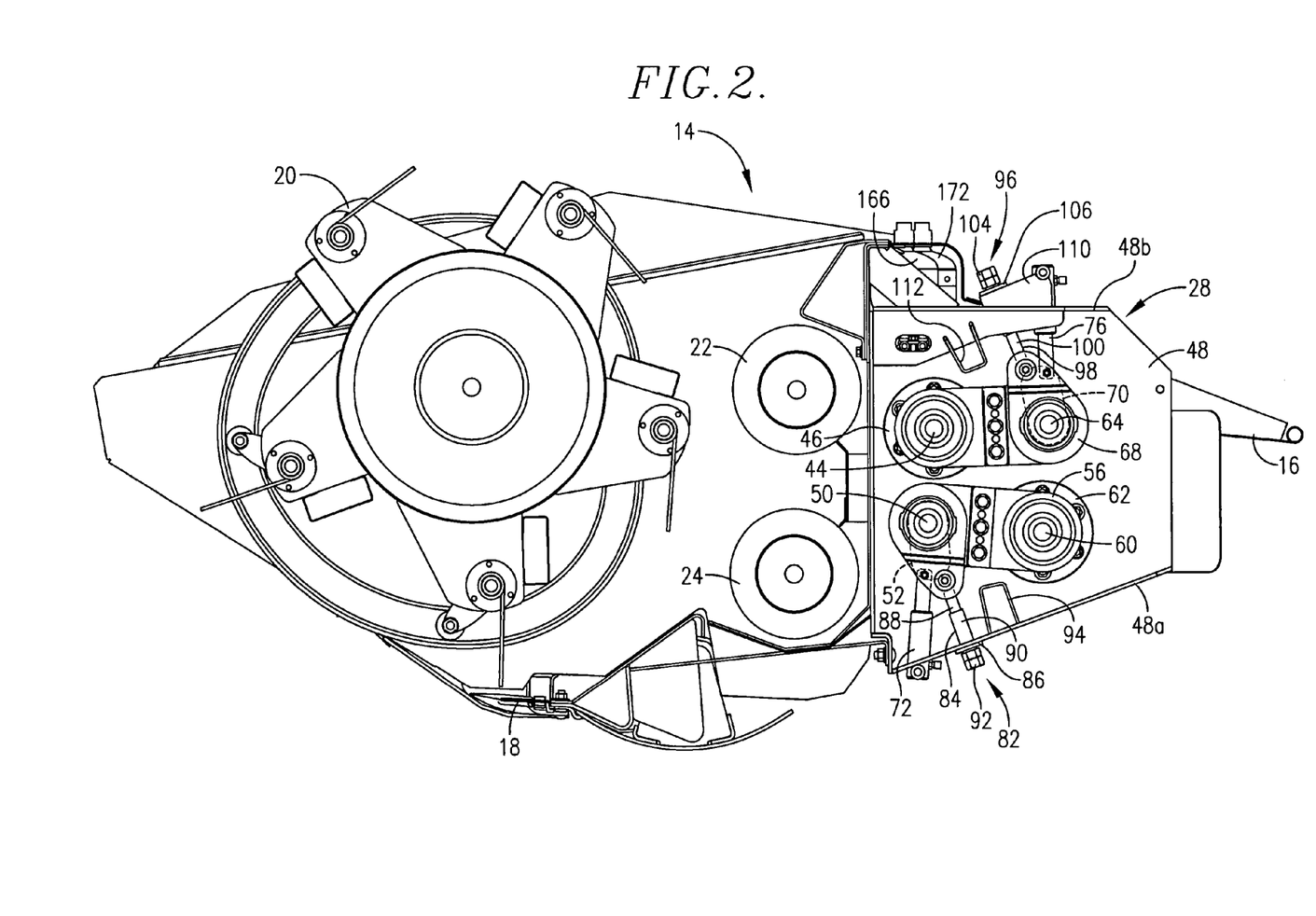
FIG. 2 is an enlarged side elevational view of the header of the prior art windrower of FIG. 1 with end panel portions thereof removed to reveal details of construction, the rolls being illustrated in their close together positions.
Figure 3:
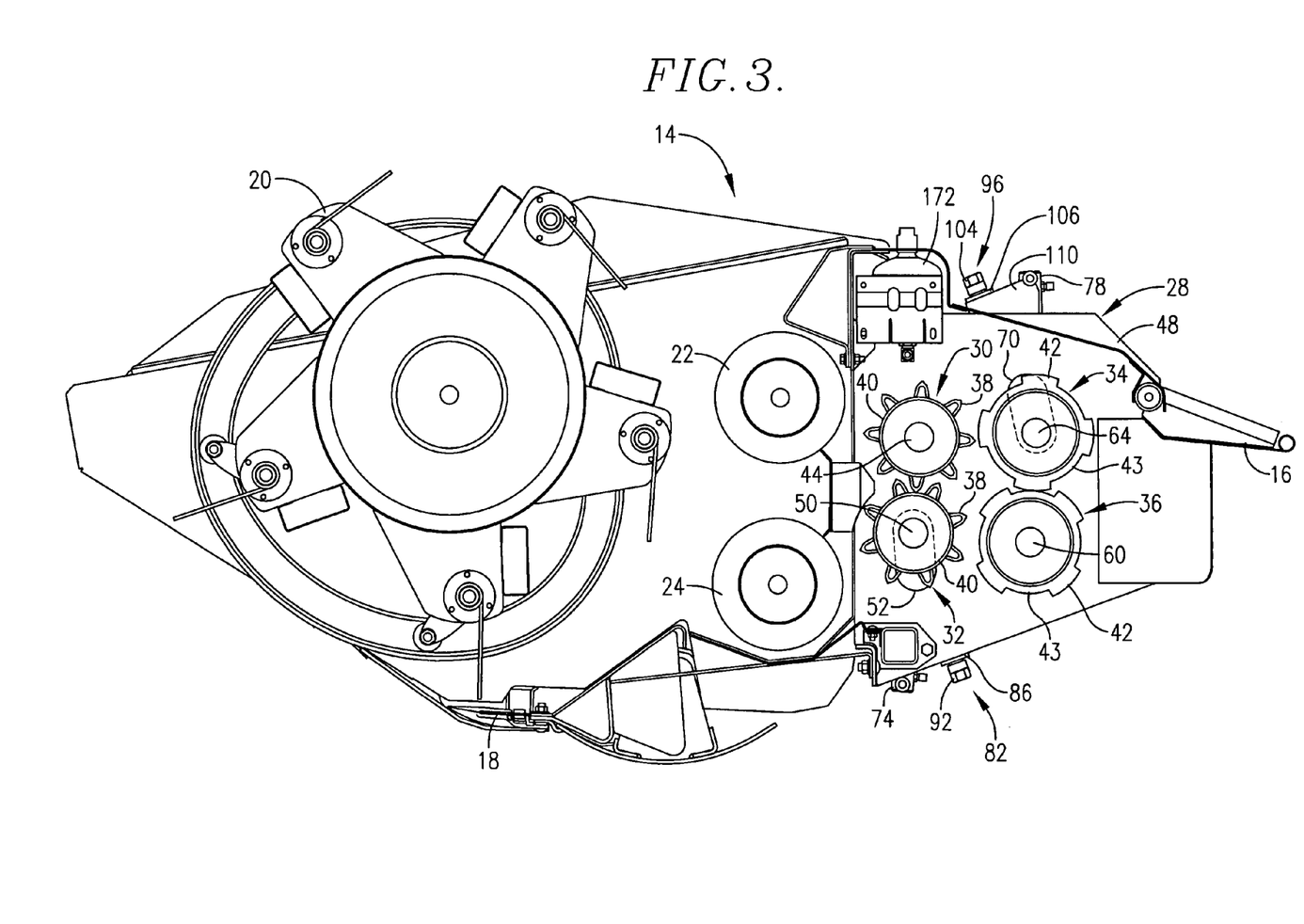
FIG. 3 is a side elevational view of the prior art header similar to FIG. 2 but with additional structure removed to show the rolls in their close together positions of FIG. 2.

The front rolls 30, 32 are provided at their opposite ends with adjustable stop structure 82 for limiting movement of lower front roll 32 upwardly toward upper front roll 30. As illustrated, for example, in FIGS. 2 and 4, such stop structure 82 includes an elongated member 84 that passes through a hole (not shown) in an outturned flange 48a of the lower edge of end wall 48 and connects at its upper end to the lower front extremity of support assembly 56. Adjacent its lower end, member 84 is provided with a stop collar 86 that is adapted to abut the bottom side of outturned flange 48a when lower front roll 32 is in its full up position as illustrated in FIGS. 2 and 3.

Figure 4:
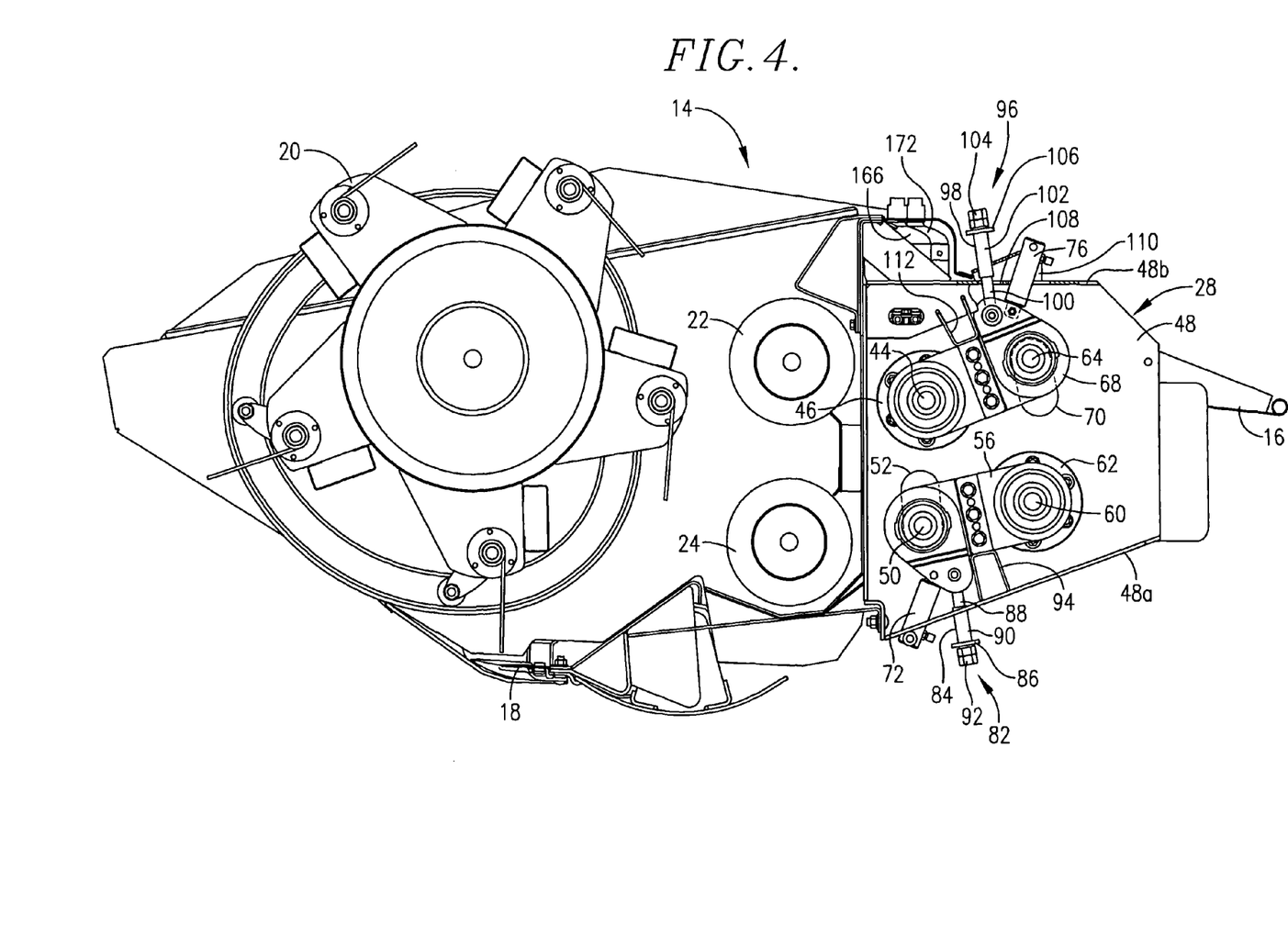
FIG. 4 is a side elevational view of the prior art header similar to FIG. 2 but showing the rolls in their fully open and spaced apart positions.
Figure 5:
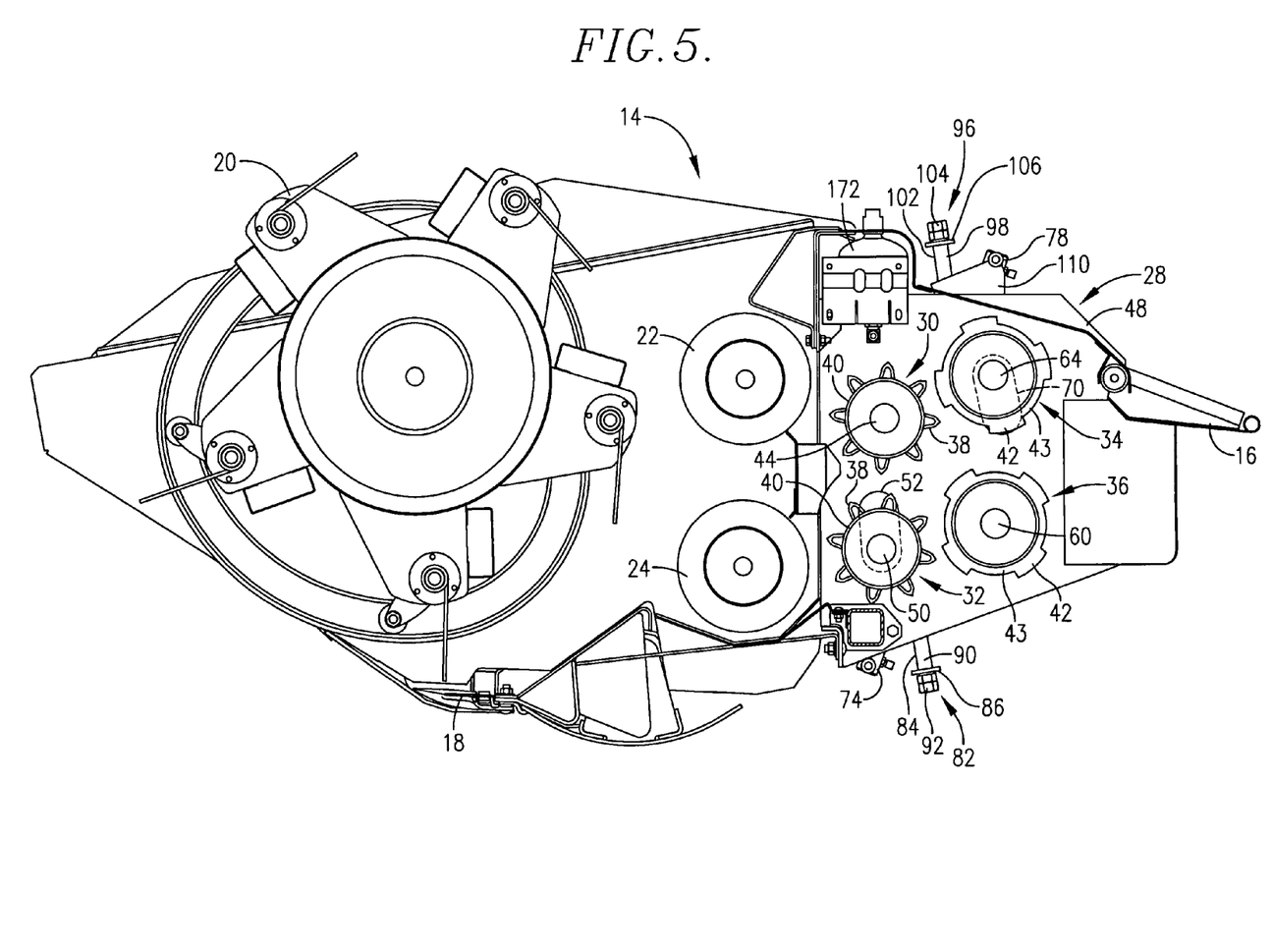
FIG. 5 is a side elevational view of the prior art header similar to FIG. 3 but illustrating the rolls fully spaced apart corresponding to the condition of things in FIG. 4.

Preferably, the position of stop collar 86 is adjustable such that, in a preferred embodiment, a running gap can be established and adjusted between front rolls 30, 32. In one preferred embodiment, such adjustability is obtained by constructing elongated member 84 in such a manner that there are two relatively telescopic parts, namely an inner elongated shank 88 and an outer elongated sleeve 90 encircling inner shank 88. Outer sleeve 90 has stop collar 86 and a nut 91 fixed to the lower end thereof to comprise a three-part weldment. Inner shank 88 is pivotally joined with support assembly 56 at an upper end and has a lower end that is threaded into nut 91. A second nut 92 is threaded onto the lower end of inner shank 88 below the sleeve/collar/nut weldment to lock the weldment against loosening rotation. Thus, rotating the weldment by applying a wrench to the nut 91 thereof after loosening second nut 92 changes the position of sleeve 90 along the length of shank 88 to correspondingly place stop collar 86 closer to or farther away from flange 48a. In the opposite direction, to limit the extent of downward movement of lower front roll 32 away from upper front roll 30, a stop bracket 94 is disposed to underlie and abut the lower edge of support assembly 56 as illustrated in FIG. 4, for example. A similar stop structure 82 and stop bracket 94 are provided on the right end of header 14.

Adjustable stop structure 96 is also provided for adjustably limiting the movement of upper rear roll 34 in a downward direction toward lower rear roll 36. As illustrated particularly in FIGS. 2 and 4, such adjustable stop structure 96 is preferably identical to stop structure 82. Like structure 82, stop structure 96 comprises an elongated member 98 that is preferably constructed from a pair of relatively telescoping parts, i.e., an inner shank 100 and an outer sleeve 102 that is axially, threadably shiftable along shank 100. The lower end of the shank 100 is pivotally connected to support assembly 68, while the upper end of shank 100 is threaded. A nut 103 and a stop collar 106 are welded or otherwise fixed to outer sleeve 102 to form a unitary sleeve/collar/nut weldment. Nut 103 of the weldment threadably receives the upper end of shank 100, while a second nut 104 is threaded onto shank 100 above nut 103 to prevent unintentional loosening. Member 98 passes through a hole 108 in an inturned flange 48b along the upper extremity of end wall 48, and stop collar 106 is adapted to abut the upper extremity of a stop bracket 110 on end wall 48 when upper rear roll 34 is in its fully lowered position as illustrated, for example, in FIG. 2. In order to limit movement of upper rear roll 34 away from lower rear roll 36, a stop bracket 112 similar to stop bracket 94 is disposed above support assembly 68 for engagement with the upper extremity of assembly 68 when upper rear roll 34 is raised to its full extent and away from lower rear roll 36. Both ends of upper rear roll 34 are provided with stop structures 96 and with stop brackets 112.

Figure 6:
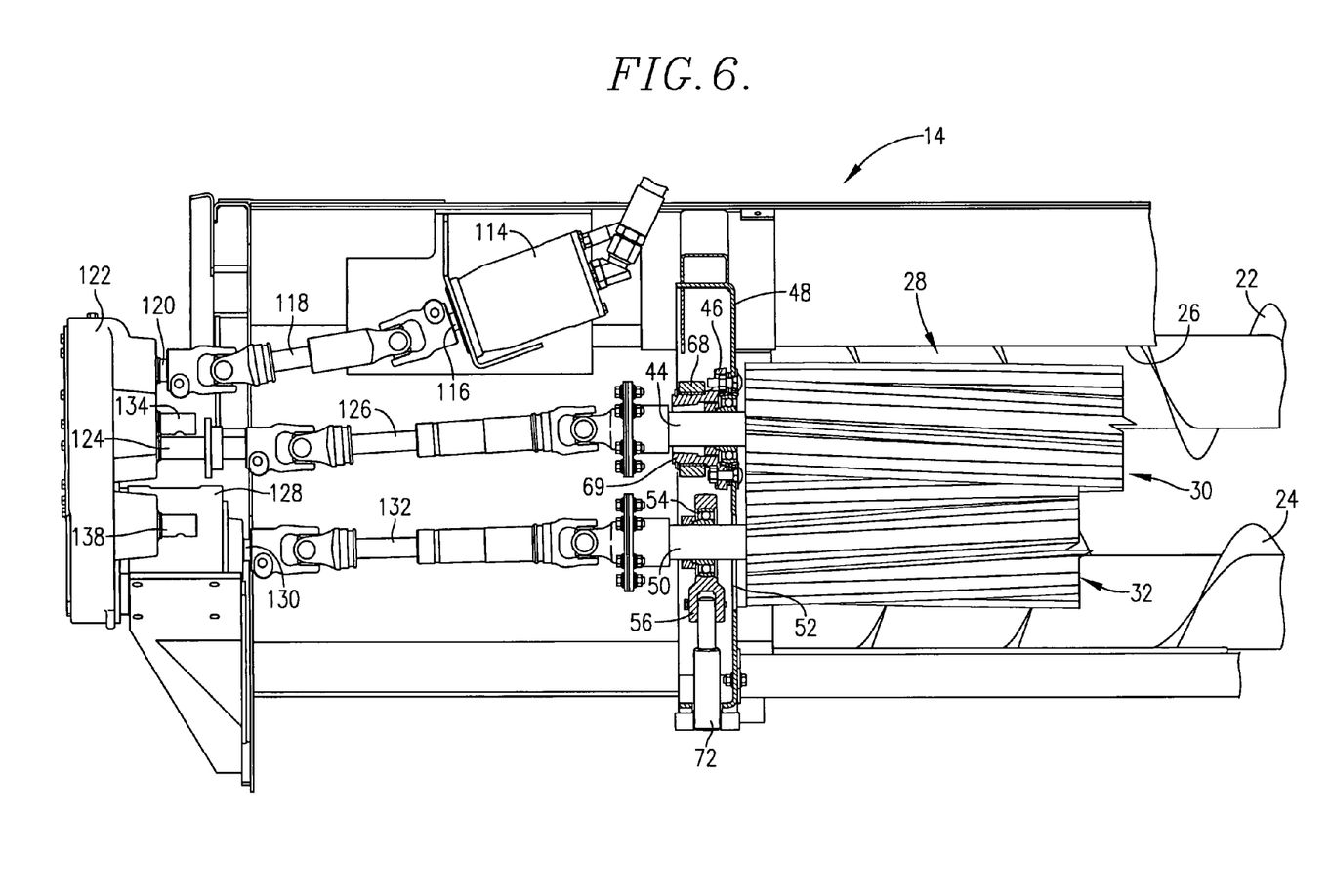
FIG. 6 is an enlarged, fragmentary, rear, vertical cross-sectional view of the prior art header taken immediately behind the front rolls and looking forwardly to reveal details of the mounting and drive arrangement for the front rolls.

As illustrated in FIG. 6, in one preferred embodiment the rolls 30, 32 and 34, 36 (not shown in FIG. 6) are hydraulically driven via a hydraulic motor 114 having an output shaft 116. Output shaft 116 is connected via a U-joint drive line 118 to an input shaft 120 of a gear case 122. An output shaft 124 of gear case 122 supplies driving power to upper front roll 30 via a telescoping U-joint drive line 126 coupled with stub shaft 44, and a gear box 128 operably coupled with gear case 122 has an output 130 that supplies driving power to the lower front conditioning roll 32 via a telescoping U-joint drive line 132 operably coupled with stub shaft 50 of lower conditioning roll 32. Gear box 128 is preferably a right angle box that also supplies driving power to other components of header 14 such as, for example, the sickle 18, which may be a double sickle such that gearbox 128 would supply driving power only to the left half of the double sickle 18. A second right angle gear box (not shown) may be connected to the stub shaft on the opposite end of lower front roll 32 for the purpose of supplying driving power to the right end of such double sickle.

Figure 7:
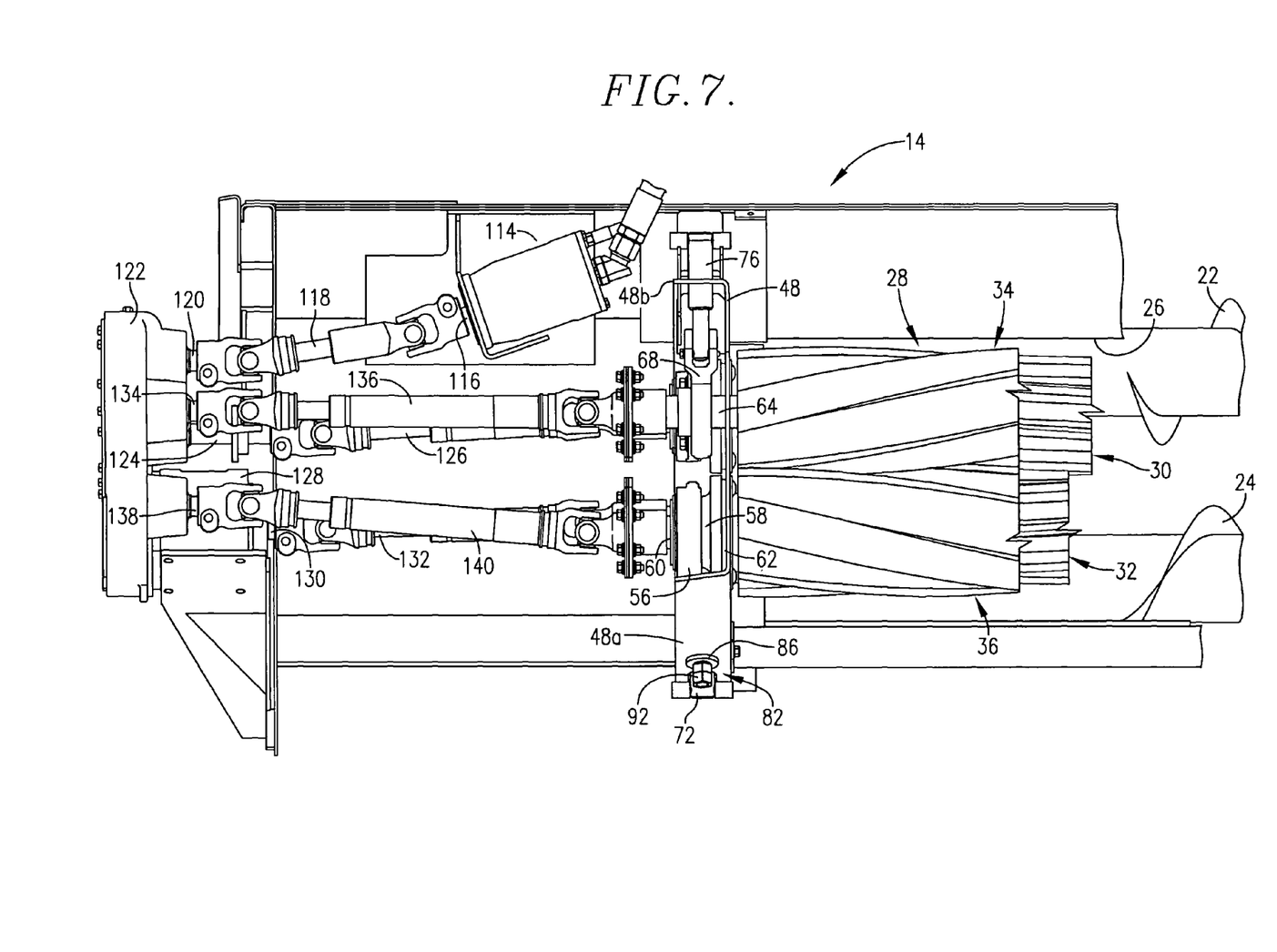
FIG. 7 is an enlarged, fragmentary rear, vertical cross-sectional view of the prior art header similar to FIG. 6 but taken further rearward than FIG. 6 from a point immediately behind the rear conditioning rolls and looking forwardly so as to reveal drive details for the rear rolls.

As shown in FIG. 7 in addition to FIG. 6, gear case 122 also is provided with an output shaft 134 that supplies driving power to the upper rear roll 34 via a telescoping U-joint drive line 136 operably coupled with stub shaft 64 of upper rear roll 34. Another output shaft 138 supplies driving power to lower rear roll 36 via a telescoping U-joint drive line 140 operably coupled with stub shaft 60 of lower rear roll 36.

As noted earlier, tension cylinders 72-78 comprise part of a tension mechanism broadly denoted by the numeral 80 and illustrated schematically in FIG. 9. In addition to the cylinders 72-78, tension mechanism 80 also includes a reservoir 142 that supplies hydraulic fluid to the rest of the system via a pump 144. Pump 144 is located in a supply line 146 leading from reservoir 142 and controlled by a solenoid-operated, two-position valve 148. A return line 150 to reservoir 142 is controlled by a two-position, solenoid-operated control valve 152. A three position switch 154, which may be conveniently located on header 14 itself or in the operating cab of tractor 12, may be used to energize solenoid valves 148 and 152. In the neutral position as shown, switch 154 maintains valves 148 and 152 in their closed positions such that no fluid may flow from pump 148 to the rest of the circuit, and no fluid may flow out of the circuit back to reservoir 142. However, when switch 154 is engaged with contact 156, solenoid valve 148 is actuated to allow the rest of the circuit to be charged with pressurized fluid. When switch 154 is moved into engagement with contact 158, solenoid valve 152 is actuated to allow the rest of the circuit to drain to reservoir 142. Switch 154 may be located either in the tractor cab or on header 14.

A main line 160 is teed into the supply line 146 and return line 150 between control valves 148 and 152. Main line 160 in turn branches into a front tension line 162 and a rear tension line 164. Front tension cylinders 72 and 74 are connected to front tension line 162 in parallel relation to one another so that both cylinders 72 and 74 receive pressurized oil simultaneously and discharge pressurized soil simultaneously. A suitable gas pressure accumulator 166, which may take the form of a number of readily commercially available units, is connected in parallel fluid flow communication with the two cylinders 72 and 74 for cushioning the conditioning tension branch of the circuit. A normally closed shut-off valve 168 is located in conditioning tension line 162 ahead of cylinders 72 and 74, along with a pressure-indicating meter 170 so that oil may be trapped within cylinders 72, 74 when valve 166 is closed. When valve 166 is open, cylinders 72, 74 may either be charged with oil or may discharge oil to reservoir 142, depending upon the position of solenoid valves 148 and 152. Valve 168 and meter 170 may be located either in the tractor cab or on the header 14.

Similarly, the rear tension line 164 has a compressive gas accumulator 172 connected thereto between rear tension cylinders 76 and 78 so as to cushion that part of the circuit. A normally closed shut-off valve 174 is located in line 164 above cylinders 76, 78, and a pressure indicating meter 176 is located in line 164 between valve 174 and the cylinders 76, 78. When valve 174 is closed, fluid is trapped in rear tension cylinders 76, 78, while when valve 174 is open, cylinders 76, 78 may either be charged with pressurized oil or may discharge oil to reservoir 142, depending upon the positions of the solenoid-powered control valves 148 and 152. Valve 174 and meter 176 may be located either in the tractor cab or on the header 14.

Different crop conditions may call for different pressure settings on the rolls as well as different gaps, if any, between the rolls. Moreover, there may be times when the operator simply wishes to change the degree or severity of conditioning of the crop materials. The present invention affords great flexibility in this respect.

Usually, but not necessarily, a gap is desired between front rolls 30, 32, and such gap may be somewhat larger than in conventional conditioning situations that use fluted steel rolls. The gap is measured between the outermost tip of one of the ribs 38 and the cylindrical core 40 of the opposing roll. Good results have been obtained where the gap is set in the range of 0.250 to 0.750 inches. Of course, the size of the gap during operations may temporarily increase significantly as slugs of material are passed therethrough and the lower roll 32 swings away from the upper roll 30. Preferably, the front rolls 30 and 32 do not touch one another.

Preferably, but not necessarily, the rear rolls 34, 36 are set to have a slight gap. Good results have been obtained where such gap is in the range of 0.001 to 0.250 inches. This insures that the wide bars 42 remain intermeshed with one another except when upper roll 34 must swing upwardly to pass a slug of material, thus assuring a powerful compressing action against the already crimped stems of materials from rolls 30 and 32. The resilient surface of rear rolls 34, 36 assists in applying the appropriate compressive force to the crop stems when the rolls are close together while allowing for manufacturing inaccuracies during formation of the long, helical bars 42.

Preferably, the front rolls 30, 32 rotate at essentially the same speeds as the rear rolls 34, 36, but somewhat faster than the gathering augers 22 and 24. This produces a condition in which the conditioning mechanism 28 tends to draw materials from augers 22, 24 such that there is little or no tendency for crop materials to accumulate upstream from front rolls 30, 32. Moreover, rear rolls 34 and 36 are positioned as close as possible to front rolls 30, 32 without making actual contact therewith. This increases the reliability of the transfer of materials from front rolls 30, 32 to rear rolls 34, 36.

To prepare the machine for conditioning operations, the operator must pressurize the tension mechanism 80 to the desired level. Rear rolls 34, 36 may be set at a higher or lower tension than front rolls 30, 32, as desired by the operator. This is accomplished by first manipulating switch 154 such that an electrical circuit is completed through contact 156, operating solenoid valve 148 to enable pump 144 to charge the system. One or the other of the shut-off valves 168, 174 is opened at this time while the other remains closed such that pressurized oil enters the opened line, such as tension line 162, to extend front cylinders 72, 74 and bring the pressure level in that portion of the circuit up to the desired level. Meter 170 may be used to determine when the desired pressure level has been reached, at which time valve 168 may be closed to trap oil in tension cylinders 72 and 74 at the desired level. Thereupon, valve 174 may be held open in the same manner to charge the rear tension cylinders 76 and 78 until such time as the desired pressure level is indicated by meter 176. Thereupon, valve 174 is closed, trapping pressurized oil in the extended rear tension cylinders 76, 78 at the selected level. Returning switch 154 to its standby position of FIG. 9 will then allow solenoid valve 148 to close. If, for any reason, it is necessary to reduce the pressure level in either the front tension cylinders 72, 74 or the rear tension cylinders 76, 78, it is only necessary to manipulate switch 154 to establish a circuit through contact 158, thereby actuating the solenoid valve 152 to open a drain path to reservoir 142. By then opening the appropriate shut-off valve 168 or 174, the pressure level in that part of the circuit can be lowered to the desired level and then the valve 168 or 174 returned to its closed position to terminate further discharge. Returning switch 154 to its standby position of FIG. 9 correspondingly allows solenoid valve 152 to reclose.

Charging of the tension cylinders 72, 74 and 76, 78 causes the rolls 30, 32 and 34, 36 to come close together to the extent permitted by the stop structures 82 and 96. In the event that the running gap between front rolls 30, 32 needs to be changed, it is a simple matter to loosen jamb nut 92 and rotate the sleeve/collar/nut weldment 90, 86, 84 in the appropriate direction to either enlarge or reduce the running gap. Similarly, in the event that the running gap between rear rolls 34, 36 needs to be changed, it is a simple matter to loosen jamb nut 104 and rotate the sleeve/collar/nut weldment 102, 106, 103 in the appropriate direction to either enlarge or reduce the dimensions of the running gap.

As the machine moves through the field of standing crop, rotating reel 20 bends, deflects and sweeps the standing materials into sickle 18 which severs the materials from the ground and allows them to be swept upwardly and rearwardly by reel 20 into engagement with the center-gathering augers 22 and 24. Augers 22 and 24 consolidate the materials centrally while distributing them evenly across the full width of opening 26 (FIGS. 6, 7), and then transfer such materials into the conditioning mechanism 28. The front rolls 30, 32 receive the crop flow from augers 22, 24 and subject the stems of the crop flow to a crimping action as the stems pass between the intermeshed ribs of rolls 30, 32. At the same time, front rolls 30, 32 serve as feeders to propel the conditioned materials rearwardly into and through the gap between rear rolls 34, 36, which rolls grab the material and flatten the stems thereof as a result of the intermeshing bars 42. Rear rolls 34, 36 project the fully conditioned materials on rearwardly in a forceful stream that engages the forming shields 16 (only the swathboard is illustrated in FIGS. 2-5) and is directed down to the ground in either a windrow or swath, depending upon the adjusted positions of shields 16.

The front rolls 30, 32 play an important role in that they not only lightly condition the crop, but also aggressively feed such materials into and through the rear rolls 34, 36. As a result of the aggressive feeding action provided by front rolls 30, 32, the squeeze pressure or tension supplied by rear rolls 34, 36 can, if desired, be higher than might otherwise be the case, resulting in a more effective flattening of the crop stems. Likewise, the gap between rear rolls 34, 36 can be smaller. Providing the rear rolls 34, 36 with a compressive surface such as rubber or other material is helpful in assuring positive feed of the materials through rolls 34, 36, while at the same time providing a sufficient conditioning action. Having rolls 34, 36 configured with wide, shallow lugs or bars as illustrated is also conducive to improved feeding action. And by providing the hard, preferably metal front rolls 30, 32 ahead of the softer rear rolls 34, 36, the rear rolls 34, 36 are more protected from stones and other hard objects which can be repelled and diverted by the metal conditioning rolls.

The Invention of FIGS. 10-15

Figure 10:
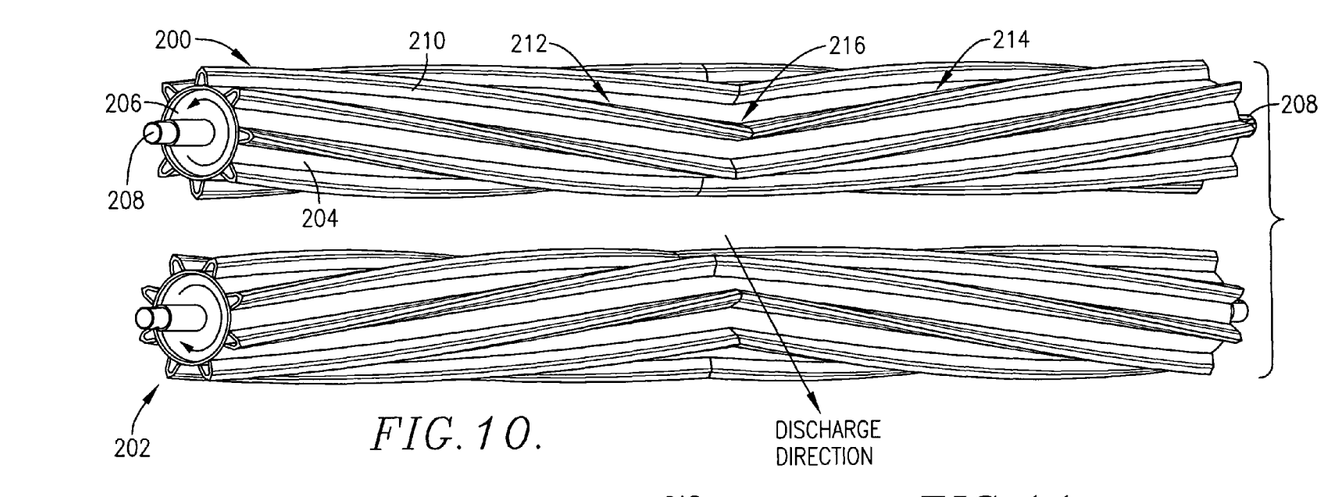
FIG. 10 is a rear isometric view of a pair of metal conditioning rolls with herringbone rib patterns in accordance with the present invention and which may be substituted for one or more sets of the rolls of the prior art machine of FIGS. 1-9.

FIG. 10 illustrates a pair of metal conditioning rolls 200 and 202 that are similar to metal rolls 30, 32 of FIGS. 1-9 except that the ribs of rolls 200, 202 are arranged in a herringbone pattern rather than extending in a continuous spiral from end-to-end of the roll. Each herringbone roll 200, 202 includes a cylindrical core 204 having a pair of opposite end plates 206 with stub shafts 208 projecting axially outwardly therefrom. Eight ribs 210 are spaced circumferentially around core 204 and project generally radially outwardly therefrom. In a preferred embodiment, each rib 210 is generally triangular in transverse cross-section and hollow, although other configurations such as solid, transversely rectangular bars may also be utilized. Each rib 210 extends longitudinally of core 204 over its entire length but comprises a pair of end-to-end rib segments 212 and 214 that meet in the middle of core 204 at an apex 216. One segment 212 extends generally helically about core 204 in a right-hand spiral toward apex 216, while the other segment 214 extends helically around core 204 in a left-hand spiral from apex 216. The two rib segments 212, 214 converge from opposite ends of core 204 toward apex 216. Each rib segment 212, 214 spirals about core 204 for 90°, commencing at the end plate 206 and terminating at the apex 216.

Rolls 200 and 202 are identical to one another, but flipped end-for-end, so that the direction of spiral of their respective rib segments 212 and 214 is reversed relative to one another. Consequently, the ribs 210 of the two rolls are adapted to intermesh with one another during operation when rolls 200, 202 are set to operate with a slight running clearance therebetween as with the rolls 30, 32 of FIGS. 1-9. Preferably, core 204 and ribs 210 are constructed from steel.

As illustrated particularly in FIG. 10, rolls 200 and 202 are oriented and driven in such a direction that the apexes 216 of the ribs 210 trail their opposite ends with respect to the direction of rotation and direction of crop discharge. Consequently, the herringbone rib pattern tends to gather crop centrally, rather than spread it toward opposite ends of the rolls.

Figure 11:
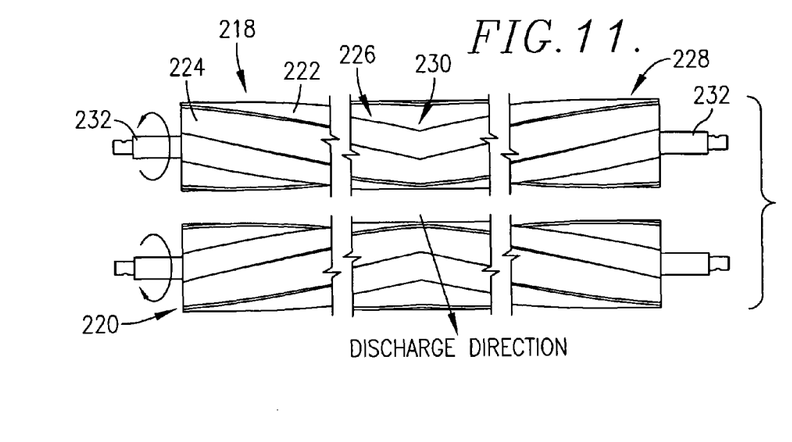
FIG. 11 is a rear elevational view of a pair of compressible surface conditioning rolls having herringbone bar patterns and which may be used in combination with the metal herringbone conditioning rolls of FIG. 10, particularly in harvesters having a sickle-style cutter.
Figure 12:
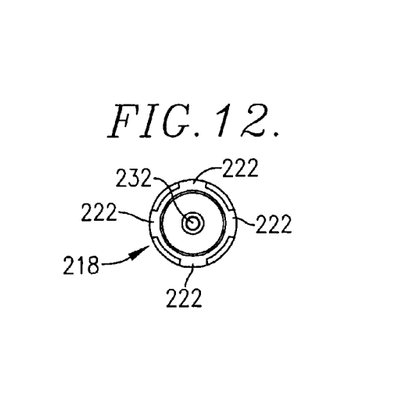
FIG. 12 is an end elevational view of one of the compressible surface rolls of FIG. 11.

FIGS. 11 and 12 show a pair of compressible surface conditioning rolls 218 and 220 that are very similar to compressible surface rolls 34 and 36 of FIGS. 1-9, with the exception that rolls 218, 220 have helical bars 222 that are arranged in a herringbone pattern instead of a continuous spiral from end-to-end of the roll. Bars 222 project generally radially outwardly from a cylindrical core 224 and are generally rectangular in transverse cross-section as illustrated in FIG. 12. Bars 222 are substantially wider than ribs 210 of rolls 200, 202, and there are a total of four bars 222 around each core 224. Each bar 222 comprises a pair of end-to-end segments 226 and 228 that spiral about core 224 in opposite directions so as to converge at an apex 230 at a location that is in the middle of core 224. Stub shafts 232 project from opposite ends of core 224.

Preferably, compressible surface rolls 218 and 220 are constructed from the same material as rolls 34 and 36 of FIGS. 1-9. Bar segments 226 and 228 of the two rolls 218, 220 spiral about the core 224 in mutually opposite directions such that the bars 222 of roll 218 are adapted to intermesh with bars 222 of roll 220 during operation. Preferably, a slight running clearance is maintained between rolls 218, 220 during operation. Like rolls 200, 202, the rolls 218, 220 are oriented and driven in such a direction that apexes 230 of ribs 222 trail the opposite ends thereof with respect to the direction of rotation of rolls 218, 220 and the direction of crop discharge.

Figure 13:
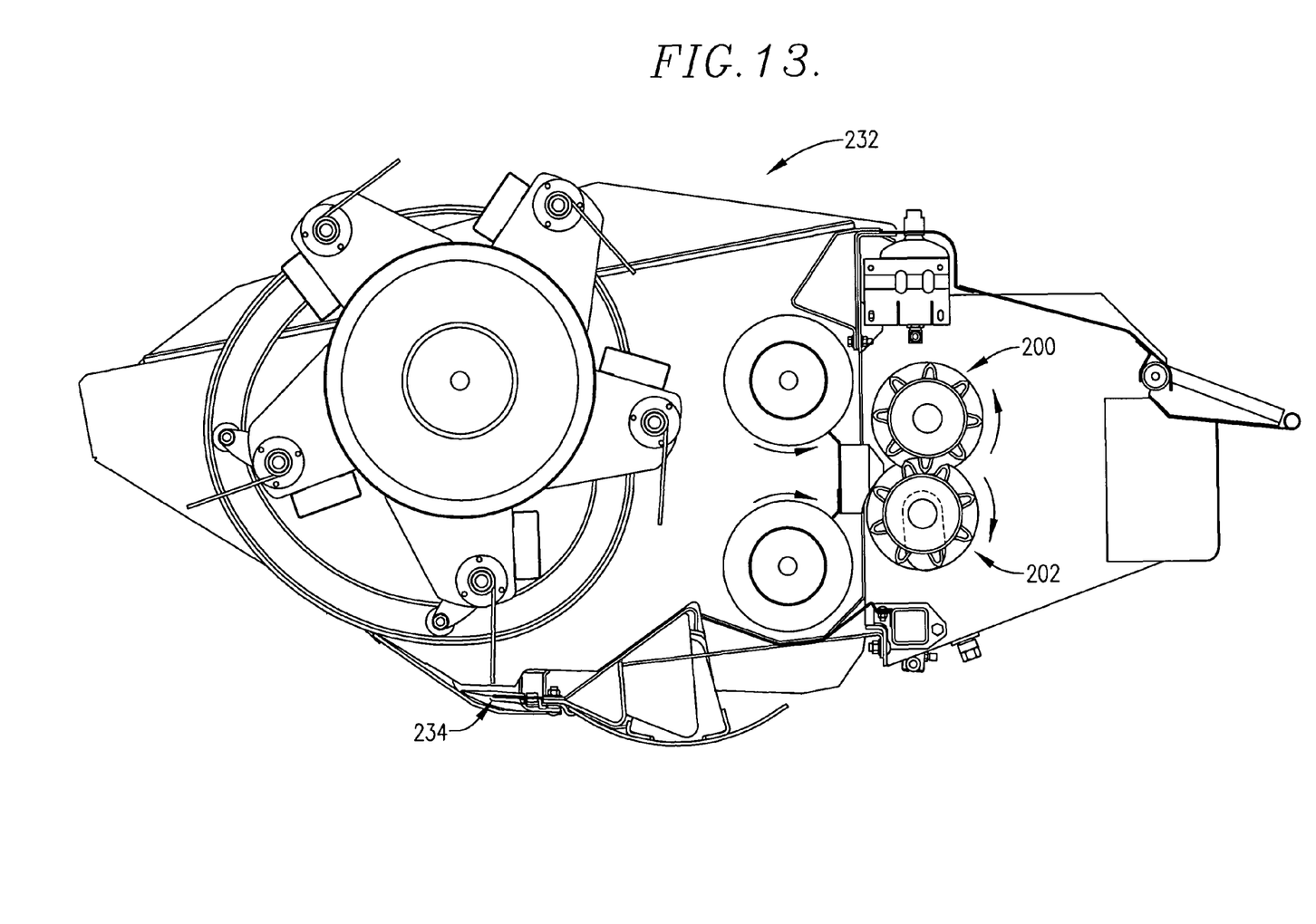
FIG. 13 is a side elevational view of a sickle-type header with the near end panel removed and utilizing a pair of metal conditioning rolls with herringbone rib patterns in accordance with the present invention.
Figure 14:
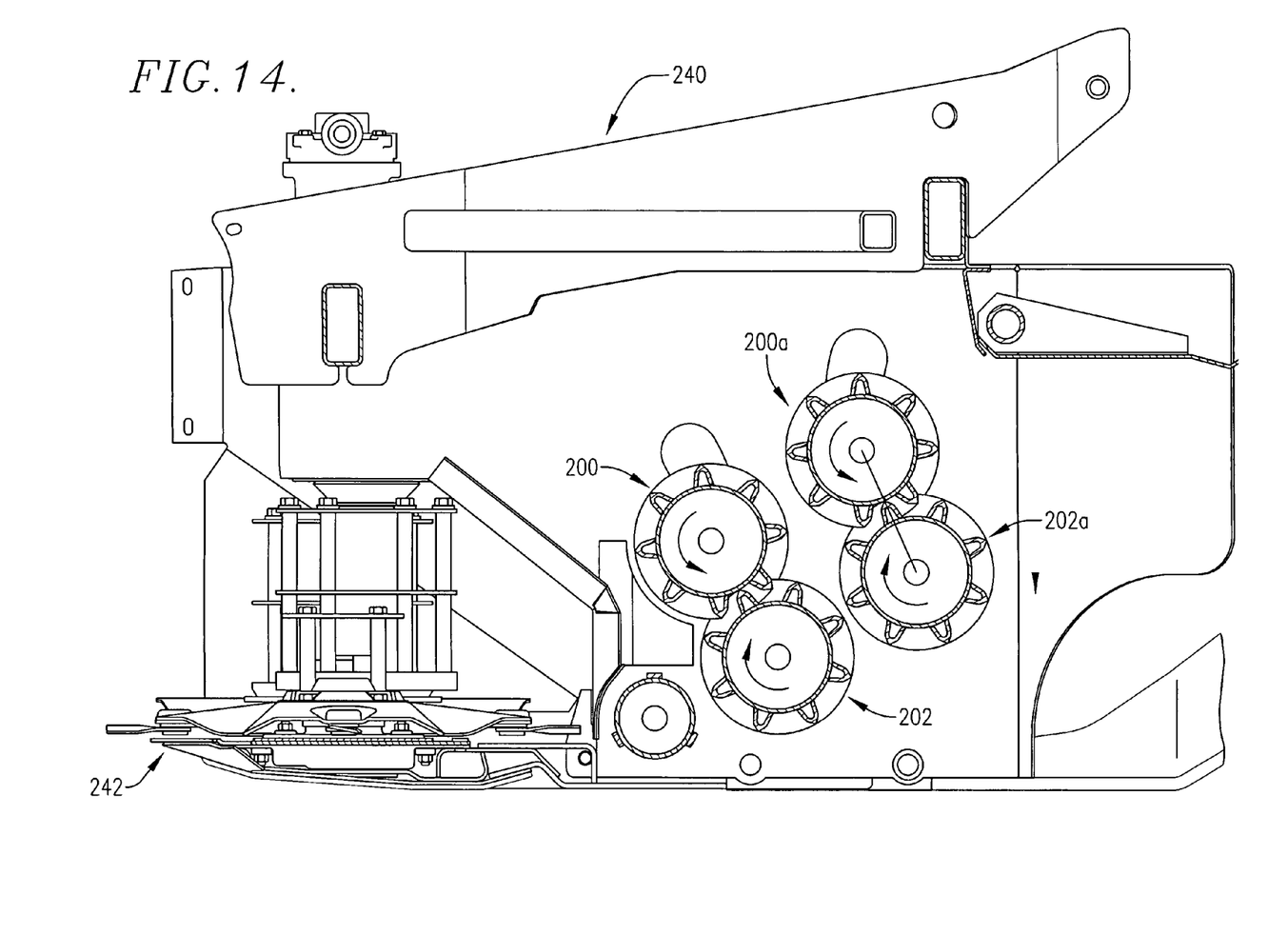
FIG. 14 is a side elevational view of a rotary-type header with the near end panel removed and utilizing two pairs of metal conditioning rolls with herringbone rib patterns in accordance with the present invention.
Figure 15:
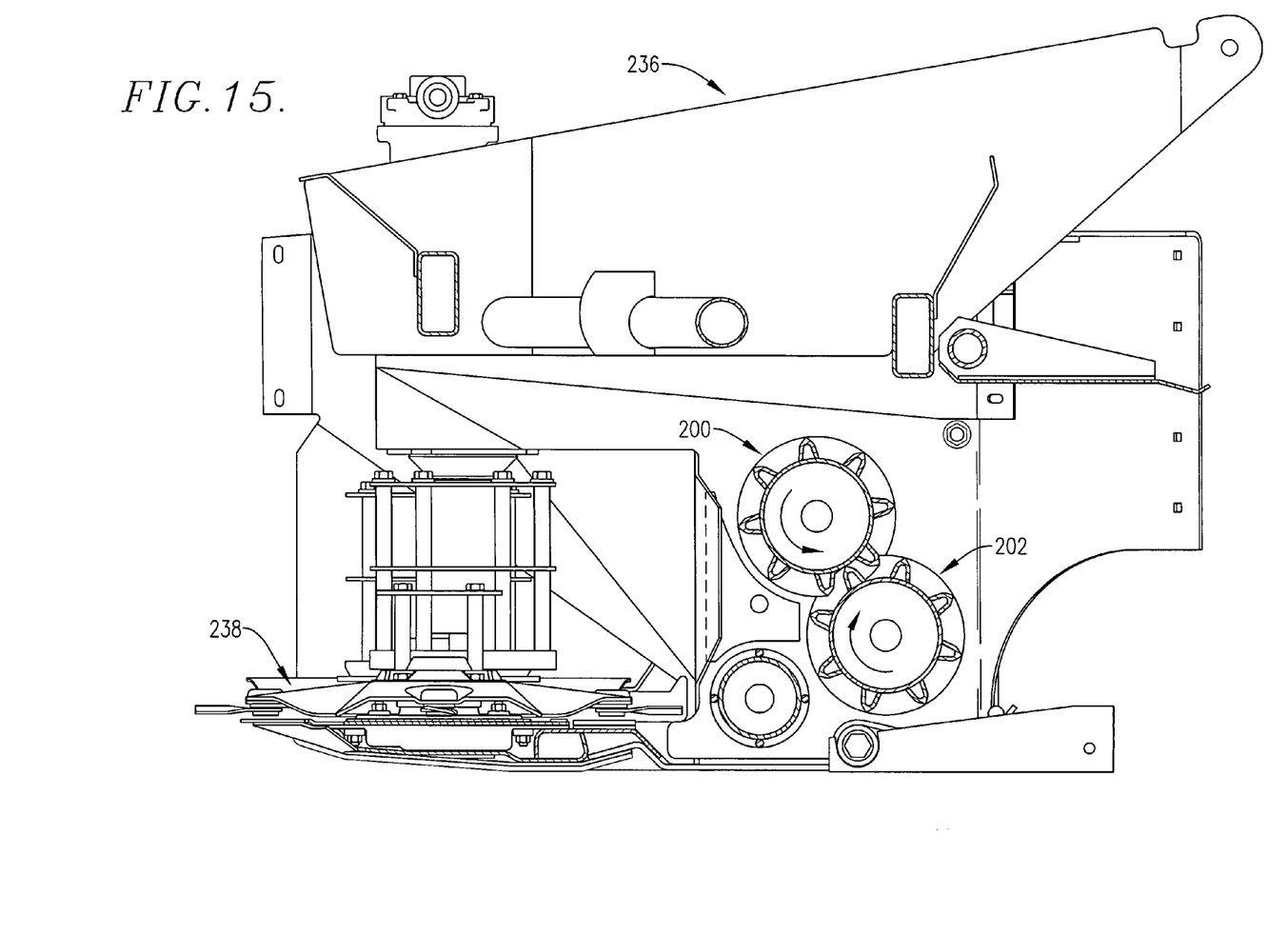
FIG. 15 is a side elevational view of a rotary-type header with the near end panel removed and utilizing a single pair of metal conditioning rolls with herringbone rib patterns in accordance with the present invention.

FIGS. 13-15 illustrate various applications for the steel herringbone rolls 200, 202. In FIG. 13, a single pair of the rolls 200, 202 is utilized in a sickle header 232 that employs a reciprocating sickle 234 to sever standing crop materials from the ground in the same manner as the sickle 18 of FIGS. 1-9. Rolls 200, 202 are driven in opposite directions as illustrated in FIG. 13 and may be tensioned in any suitable manner so as to be relatively biased toward one another to the extent permitted by adjustable stop mechanism similar to that provided with respect to the machine of FIGS. 1-9. A hydraulic tensioning arrangement similar to that illustrated in FIG. 9 may be utilized, or a tensioning spring arrangement as disclosed in U.S. Pat. No. 4,896,483 assigned to the assignee of the present invention may be appropriate. The '483 patent is hereby incorporated by reference into the present specification.

If additional conditioning action is desired, a set of compressible surface herringbone rolls such as the rolls 218 and 220 may be provided behind steel herringbone rolls 200, 202 in the sickle header of FIG. 13. Rolls 200, 202 and 218, 220 are preferably supported, driven and tensioned in the same manner as rolls 30, 32 and 34, 36 of FIGS. 1-9.

FIG. 15 shows a pair of the steel herringbone rolls 200, 202 utilized within a rotary header 236 employing a series of rotary cutters 238 as the cutoff means for standing crop. Such rotary cutters 238 may take the form of those disclosed in U.S. Pat. No. 6,158,201 assigned to the assignee of the present invention and hereby incorporated by reference into the present specification. Rolls 200, 202 are driven in mutually opposite directions by means disclosed in the '201 Patent or other suitable mechanisms and may be supported and tensioned in the same manner as in the '201 Patent. In the alternative, a hydraulic tensioning arrangement similar to that illustrated in FIG. 9 for use with the header of FIGS. 1-9 may be utilized.

FIG. 14 discloses the use of two pairs of steel herringbone rolls utilized in a rotary header 240. Header 240 utilizes a front pair of steel herringbone rolls 200 and 202, along with a rear pair of steel herringbone rolls 200a and 202a. Header 240 utilizes a series of rotary cutters 242 ahead of front rolls 200, 202 in the same manner as the rotary cutters 238 of FIG. 15. Preferably, a hydraulic tensioning system similar to that illustrated in FIG. 9 is utilized for tensioning rolls 200, 202 and 200a, 202a.

The herringbone pattern of the ribs and bars in FIGS. 10-15 has the effect of converging the conditioned crop materials toward the center as they pass between and are discharged by the conditioning rolls. This action produces a windrow or swath that is significantly more uniform across its full width than is typically obtainable with continuous spiral rolls. While the herringbone pattern alone produces improved results even in compressible surface conditioning rolls, constructing the ribs from a hard substance such as steel provides an extra measure of aggressiveness that increases the center gathering action.

In machines using rotary cutoffs, such as found in headers 236 and 240, the use of the steel herringbone rolls is especially beneficial. Because rotary machines typically run at faster ground speeds than sickle machines, they present larger volumes amounts of crop materials to the conditioning rolls per unit of time, creating a challenge to proper and effective conditioning. The extra aggressiveness of the steel herringbone rolls is particularly helpful in handling this increased volume while at the same time improving the uniformity of distribution across the windrow or swath. Further, having a second set of steel herringbone rolls behind the first set as illustrated in FIG. 14 allows the operator to have the conditioning flexibility obtainable with the machine of FIGS. 1-9 but with the advantages of a rotary cutoff machine. In addition, the extra pair of herringbone conditioning rolls provides an extra measure of center gathering action to further promote uniformity of distribution in the windrow or swath.

One characteristic of rotary cutoff machines is that the crop materials tend to enter the inlet to the conditioning rolls in multiple streams from pairs of counter rotating cutters instead of in a single mass. The steel herringbone rolls are particularly advantageous in merging such separate streams into a common evenly distributed stream so as to promote improved drying characteristics and hay quality.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. In a machine for cutting and conditioning crop materials wherein the machine has a cutting width that is greater than the width of a central discharge opening leading to conditioning rolls of the machine and crop materials must be consolidated centrally from opposite lateral sides of the opening before moving rearwardly through the opening to the rolls, the improvement comprising:

a front pair of mutually oppositely rotatable, non-compressible surface rolls behind the opening adapted to receive a stream of crop materials, condition the materials as they pass between the rolls, and feed the materials rearwardly, each of said front rolls comprising a cylindrical metal core and a plurality of circumferentially spaced metal ribs projecting generally radially outwardly from the core and extending lengthwise thereof, said ribs being arranged in a generally herringbone pattern around the core, with each rib comprising a pair of end-to-end rib segments that converge generally helically from opposite ends of the core to a centrally disposed apex, said rolls of the front pair being rotated in such a direction during operation that the apex of each rib trails outer ends of the rib with respect to the direction of rotation, the ribs of one front roll being adapted to intermesh with the ribs of the other front roll;

a rear pair of mutually oppositely rotatable, compressible surface rolls disposed to receive crop materials from the front rolls and subject the crop to a further conditioning action, each of said rear rolls comprising a cylindrical core and a plurality of circumferentially spaced bars projecting generally radially outwardly from the core and extending lengthwise thereof, said bars being arranged in a generally herringbone pattern around the core, with each bar comprising a pair of end-to-end bar segments that converge generally helically from opposite ends of the core to a centrally disposed apex, said rolls of the rear pair being rotated in such a direction during operation that the apex of each bar trails outer ends of the bar with respect to the direction of rotation, the bars of one rear roll being adapted to intermesh with the bars of the other rear roll; and tension mechanism operably coupled with the front and rear pairs of rolls in a manner to resist relative movement of the rolls of each pair away from one another.

2. In a machine as claimed in claim 1,
each rib segment wrapping around the core for approximately 90° from an end of the core to the apex.

3. In a machine as claimed in claim 1,
each rib being generally triangular in transverse cross-section.

4. In a machine as claimed in claim 1,
each bar segment wrapping around the core for approximately 90° from an end of the core to the apex.

5. In a machine as claimed in claim 1,
each bar segment being generally rectangular in transverse cross-section.

6. In a machine as claimed in claim 1,
wherein the crop materials are cut by a reciprocating sickle in front of the front rolls and extending generally parallel thereto.

7. In a machine as claimed in claim 1,
said centrally disposed apexes of the rib segments and the centrally disposed apexes of the bar segments being pointed.

8. A method of cutting and conditioning crop materials comprising the steps of:

making a cut through standing crop material that is wider than the width of a centrally disposed opening leading to conditioning rolls and consolidating the cut materials centrally from opposite lateral sides of the opening before the materials move rearwardly through the opening to the conditioning rolls;

passing the crop materials between a pair of oppositely rotating ribbed metal rolls located behind the opening while the rolls are under tension and wherein the ribs intermesh and are arranged in a generally herringbone pattern around a core of the roll, each rib comprising a pair of end-to-end rib segments that converge generally helically from opposite ends of the core to a centrally disposed apex, said rolls being rotated in such a direction during operation that the apex of each rib trails outer ends of the rib with respect to the direction of rotation; and passing the crop materials between a pair of oppositely rotating compressible surface rolls while the compressible surface rolls are under tension after passing the crop materials between the metal conditioning rolls, the compressible surface rolls having intermeshing bars that are arranged in a generally herringbone pattern around a core of the roll, with each bar comprising a pair of end-to-end bar segments that converge generally helically from opposite ends of the core to a centrally disposed apex, said compressible surface rolls being rotated in such a direction during operation that the apex of each bar trails outer ends of the bar with respect to the direction of rotation.

9. A method of cutting and conditioning crop materials as claimed in claim 8,
said cutting of standing crop material being carried out using a reciprocating sickle ahead of the metal conditioning rolls.

10. A method of cutting and conditioning crop materials as claimed in claim 8,
wherein the centrally disposed apexes of the rib segments and the centrally disposed apexes of the bar segments are pointed.

* * * * *